(12) United States Patent
Puthenpura et al.

(10) Patent No.: US 8,340,680 B2
(45) Date of Patent: Dec. 25, 2012

(54) METHOD AND APPARATUS FOR PLANNING MOBILE SWITCHING CENTERS IN A WIRELESS NETWORK

(75) Inventors: Sarat Puthenpura, Berkeley Heights, NJ (US); David G. Belanger, Hillsborough, NJ (US); Abraham George, Lake Hiawatha, NJ (US); Sam Houston Parker, Cranbury, NJ (US); Wenjie Zhao, Princeton, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 53 days.

(21) Appl. No.: 12/959,185

(22) Filed: Dec. 2, 2010

(65) Prior Publication Data

US 2012/0142360 A1    Jun. 7, 2012

(51) Int. Cl.
    *H04L 12/42* (2006.01)
(52) U.S. Cl. .................. 455/453; 455/452.1; 455/452.2; 370/329
(58) Field of Classification Search .................. 455/453, 455/452.1, 452.2; 370/329
See application file for complete search history.

(56) References Cited

U.S. PATENT DOCUMENTS

| 7,177,649 | B1 * | 2/2007 | Nielsen | 455/453 |
| 7,817,996 | B2 * | 10/2010 | Brunner | 455/422.1 |
| 2011/0016190 | A1 * | 1/2011 | He et al. | 709/206 |

* cited by examiner

*Primary Examiner* — Danh Le

(57) ABSTRACT

A method and apparatus for providing planning of a plurality of mobile switching centers in a wireless network are disclosed. For example, the method obtains input data, and determines a limit for at least one mobile switching center parameter in accordance with the input data. The method determines if the limit for the at least one mobile switching center parameter is exceeded and determines an optimal output for an objective function, wherein the objective function is based on a plurality of penalty factors, if the limit for the at least one mobile switching center parameter is exceeded.

19 Claims, 4 Drawing Sheets

METHOD AND APPARATUS FOR PLANNING MOBILE SWITCHING CENTERS IN A WIRELESS NETWORK

The present disclosure relates generally to communication networks and, more particularly, to a method and apparatus for planning mobile switching centers in a wireless network, e.g., a cellular network.

BACKGROUND

As Internet usage continues to grow, more and more customers are accessing communications services via a mobile device, e.g., a cell phone, a smart phone, etc. For example, a customer may receive multimedia content via his/her cell phone. The cell phone transmits and receives voice and data packets to and from the service provider's network via a base station and an access network.

The customer's ability to access services via a mobile device is dependent on the availability of capacity on various network elements, e.g., base station subsystems, radio access networks, cell site equipment, core network nodes responsible for communicating with user endpoint devices via the base station subsystems or radio access networks, and so on. The service provider then needs to perform capacity planning and manage the performance of the network. However, capacity planning requires consideration of many factors such as load balancing, capital cost, etc. One approach for planning capacity is manually manipulating parameters associated with each relevant factor until an experienced planner deems the result satisfactory. Unfortunately, this manual approach is labor intensive and highly non-optimal for capacity planning of large networks.

SUMMARY OF THE DISCLOSURE

In one embodiment, the present disclosure describes a method and apparatus for providing planning of a plurality of mobile switching centers in a wireless network. For example, the method obtains input data, and determines a limit for at least one mobile switching center parameter in accordance with the input data. The method determines if the limit for the at least one mobile switching center parameter is exceeded and determines an optimal output for an objective function, wherein the objective function is based on a plurality of penalty factors, if the limit for the at least one mobile switching center parameter is exceeded.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method and apparatus for planning mobile switching centers in a wireless network, e.g., a cellular network. Although the teachings of the present disclosure are discussed below in the context of a wireless network, the teaching is not so limited. Namely, the teachings of the present disclosure can be applied for other types of networks, wherein the planning of capacity requires simultaneous consideration of multiple factors.

Figure 1:
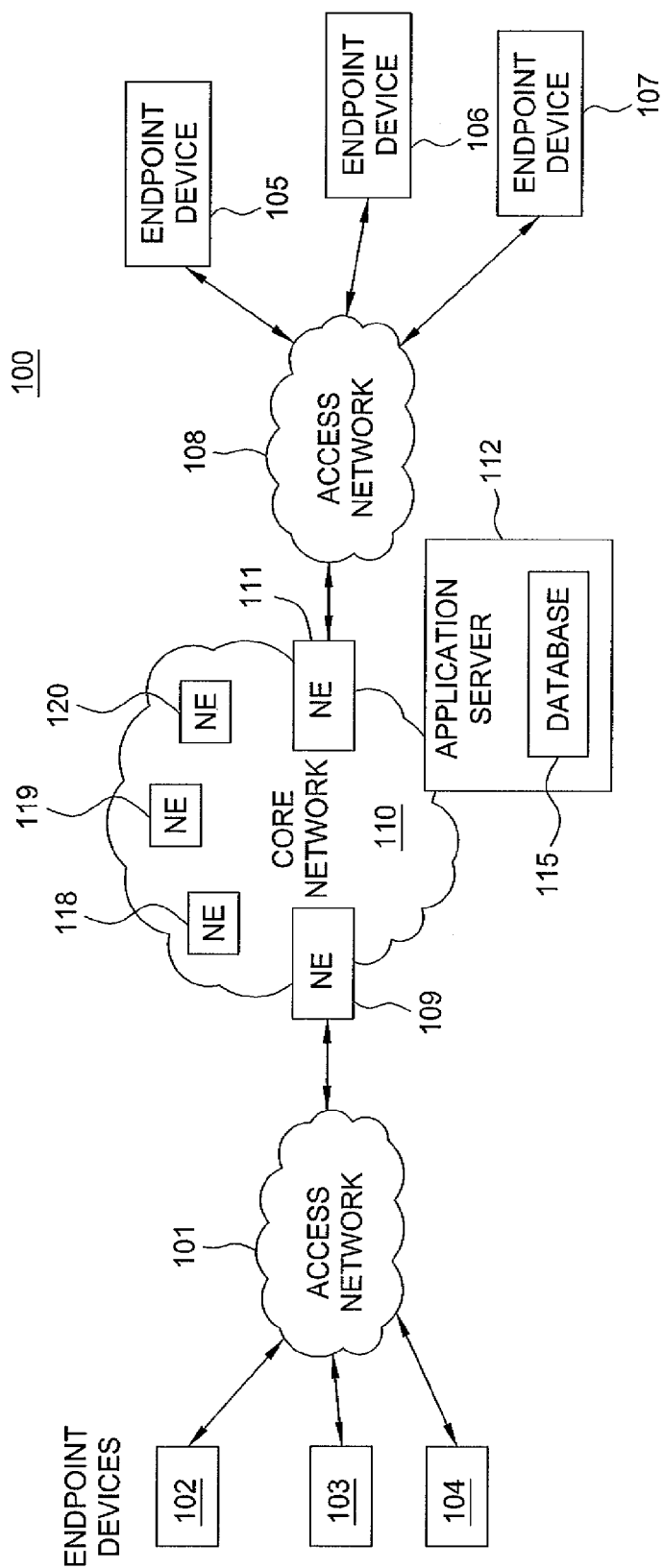
FIG. 1 is a block diagram depicting an illustrative network related to the current disclosure.

FIG. 1 is a block diagram depicting an illustrative network 100 related to the current disclosure. Illustrative networks may include Internet protocol (IP) networks, IP Multimedia Subsystem (IMS) networks, Ethernet networks, wireless networks and the like.

In one embodiment, the network may comprise a plurality of endpoint devices 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements 109 and 111 may serve as gateway servers or edge routers for the network 110.

The endpoint devices 102-107 may comprise customer endpoint devices such as personal computers, laptop computers, servers, routers, wireless phones, and the like. The access networks 101 and 108 serve as a means to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a Wireless Access. Network (WAN), a Radio Access Network (RAN), a Base Station Subsystem (BSS), a $3^{rd}$ party network, a cellular network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure can be implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements and so on are depicted in FIG. 1, the communication system 100 may be expanded by including additional endpoint devices, access networks, network elements, and/or application servers, without altering the teachings of the present disclosure. The above network 100 is described to provide an illustrative environment in which data for various services, e.g., voice and data services are transmitted on networks.

In one embodiment, a service provider may enable customers to access services via a wireless access network, e.g., a base station subsystem or a radio access network. For example, a customer may use a cell phone or a smart phone to access Internet Protocol (IP) services, multimedia services, and the like. The packets from and to the wireless device, e.g., cell phone, may then traverse one or more base station subsystems, radio access networks and network equipment, e.g., base stations, backhaul equipment, etc. A base station for a 2G network is also referred to as a base transceiver station. A base station in a 3G network is also referred to as Node B. It should be noted base stations in accordance with other network protocols or standards are within the scope of the present disclosure.

In one embodiment, a base station for a wireless network may be deployed with one or more directional antennas that cover a predetermined portion of the 360 degree angle. The coverage of one directional antenna is determined by dividing the 360 degrees by the number of directional antennas included in the base station. A portion of a wireless network that is covered with one directional antenna is referred to as a sector. For example, if there are three directional antennas at a base station, each directional antenna covers 120 degrees, thereby resulting in three sectors. The exemplary base station may also be referred to as a three sector base station.

In one embodiment, each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors above may use one third of available frequency resources. Adjacent sectors use different frequency ranges. The channels for adjacent sectors are then assigned in mutually exclusive frequency ranges such that interference is minimized.

In one embodiment, each base station in a 3G wireless network is controlled by a radio network controller (RNC). However, the 3G wireless network may have a plurality of radio network controllers. For each base station, a specific radio network controller is then selected from among the plurality of radio network controllers. The assigning of a base station to a specific radio network controller may also be referred to as homing the base station to a radio network controller. For example, a specific base station "A" may be homed to a specific radio network controller "X." The specific radio network controller X is then responsible for controlling the traffic traversing through the base station A. If at a later time period, another radio network controller Y is selected to control the traffic traversing through the base station A, the base station A is said to be re-homed to the radio network controller Y.

Similarly, in one embodiment, each base station in a 2G wireless network is controlled by a base station controller (BSC). The 2G wireless network may have a plurality of base station controllers. Each of the base station subsystems may comprise a plurality of base station controllers. For each base transceiver station, a specific base station controller is then selected from among the plurality of base station controllers. The assigning of a base transceiver station to a specific base station controller may be referred to as homing the base station to a base station controller.

The radio network controllers and base station controllers route calls from user endpoint devices towards their destination via the service provider's core network. Similarly, calls destined to the user endpoint devices traverse the core network to reach either a radio network controller (for 3G) or a base station controller (for 2G). As applicable, the radio network controller or the base station controller will forward the calls towards their intended user endpoint devices.

However, calls to and from the wireless networks (2G and 3G) are routed through the core network based on the type of call. For example, voice calls and data calls (broadly data sessions) are routed via different types of network nodes. Consequently, the amount of voice calls supported by the wireless network may affect the types of network nodes that support voice calls. Similarly, the amount of data calls may affect the types of network nodes used to support data calls. In order to clearly illustrate the impact of voice and data traffic on the core network, the following network terminologies are first provided:

General packet radio service (GPRS);
Serving GPRS support node (SGSN);
Gateway GPRS support node (GGSN);
Mobile switching center (MSC);
Gateway mobile switching center (GMSC);
Gb interface;
A-bis interface;
Ater interface;
A-interface;
IuB interface;
IuR interface;
IuR-G interface;
IuCS interface; and
IuPS interface.

In one embodiment, a General Packet Radio Service (GPRS) refers to a communications service used to transfer data via a cellular network. GPRS is available to users of a 2G cellular system GSM (global system for mobile communication). The GPRS provides an enhancement to the GSM system so that data packets are supported.

In one embodiment, a Serving GPRS Support Node (SGSN) refers to a network node responsible for communicating with user endpoint devices and routing of data calls. For example, the SGSN may send and receive data packets to and from user endpoint devices in the coverage area of the SGSN.

In one embodiment, a Gateway GPRS Support Node (GGSN) refers to a network node responsible for the interworking between the GPRS network and external packet switched networks, e.g., the internet. The GGSN converts the GPRS packets coming from the SGSN into the packet data protocol (PDP) format of the external packet network. For example, the GPRS packet may be converted to an internet protocol packet prior to being sent to the external network, which is internet protocol based.

In one embodiment, a Mobile Switching Center (MSC) refers to a network node that is responsible for communicating with user endpoint devices, routing voice calls and providing other services. For example, the MSC may setup and release end-to-end connections and perform handover during a call to handle mobility of user endpoint devices.

In one embodiment, a Gateway mobile switching center (GMSC) refers to a network node that determines which mobile switching center (MSC) is currently being visited by a called party.

In one embodiment, a Gb interface refers to an interface between a base station subsystem and an SGSN. The transmission protocol of the Gb interface may be based on a packet protocol, e.g., an internet protocol or a frame relay protocol.

In one embodiment, an A-bis interface refers to an interface between the BTS and BSC. The A-bis interface may be carried on a Time Division Multiplexing (TDM) based circuit. For example, the TDM circuit may be a DS-1 (digital signal 1), an E1 (European line rate 1) circuit, etc.

In one embodiment, an Ater interface refers to an interface between the BSC and a transcoder. The transcoder may be a separate device located between the BSC and MSC, or may be integrated into either the BSC or the MSC. Ater interface also carries the A-interface (described below) information from the BSC to the MSC without processing or modifying the information. For example, a transcoder processes the voice information while allowing the SS7 signaling information to pass through untouched such that the signaling is processed by the BSC and the MSC.

In one embodiment, an A-interface refers to an interface between the BSC and the MSC. It is used for carrying voice traffic channels.

In one embodiment, an IuB interface refers to an interface used to link the RNC with base stations.

In one embodiment, an IuR interface refers to an interface that links two RNCs.

In one embodiment, an IuR-G interface refers to an interface that links two BSCs.

In one embodiment, an IuCS-interface refers to an interface between the RNC and the MSC used in 3G networks.

In one embodiment, an IuPS-interface refers to an interface between the RNC and the SGSN used in 3G networks.

In one embodiment, a service provider's core network may comprise one or more mobile switching centers (MSCs), one or more gateway mobile switching centers (GMSCs), one or more serving GPRS support nodes (SGSNs), one or more gateway GPRS support node (GGSNs). In order to route the calls to and from the user endpoint devices, each of the radio network controllers and base station controllers are homed to an SGSN for data calls and to an MSC for voice calls. However, the core network may contain a plurality of SGSNs to which a radio network controller or a base station may be homed. Similarly, the core network may contain a plurality of MSCs to which a radio network controller or a base station controller may be homed. For each radio network controller, a specific SGSN and a specific MSC is selected from among the plurality of SGSNs and MSCs. Similarly, for each base station controller, a specific SGSN and a specific MSC is selected from among the plurality of SGSNs and MSCs. Thus, in order to meet the needs of the users accessing services via the 2G and/or 3G networks, capacity planning of core network nodes will be beneficial.

In one embodiment, the core network nodes, e.g., the SGSNs, GGSN, MSCs and GMSCs may be communicating with user endpoint devices accessing services via a 2G or a 3G wireless network. For example, a particular network node may operate in dual mode such that user endpoint devices are able to access services via either the 2G or 3G wireless network. In another embodiment, the core network node may communicate with user endpoint devices accessing services only via a 3G wireless network. In yet another embodiment, the core network node may communicate with user endpoint devices only via a 2G wireless network. As such, the capacity planning of the core network nodes may depend on the connectivity to both 2G and 3G wireless networks, connectivity to only the 3G wireless networks, or connectivity to only the 2G wireless networks.

If the planning is for core network nodes with connectivity to both the 3G and 2G networks, the resulting capacity plan provides homing of radio network controllers and base station controllers to the core network nodes. If the capacity planning for core network nodes is for network nodes with connectivity to the 3G wireless network, the resulting capacity plan provides homing of radio network controllers to the core network nodes. If the capacity planning is for core network nodes with connectivity to the 2G network, the resulting capacity plan provides homing of base station controllers to the core network nodes.

In order to describe a typical user interaction via a 3G network, suppose a user initiates a call via the base station A which is controlled by the radio network controller X. Suppose the user then moves from one cell site to another cell site necessitating a hand over from the base station A to a second base station B. If the call is being handed over to a base station in another radio network controller's territory (e.g., radio network controller Y controlling base station B), the radio network controller X needs to hand over the call to the radio network controller Y. This example illustrates that if the first and the second base stations are not controlled by the same radio network controller, then the call may need to be handed over to another radio network controller.

Suppose the radio network controllers X and Y are homed to different MSCs and different SGSNs in the core network. The handover of calls from one radio network controller to another radio network controller then requires extra signaling, and may incur delay. For example, if the call is a voice call, the handover would necessitate extra signaling to the MSC. In another example, if the call is a data call, the handover would necessitate extra signaling to the SGSN. The handover of a call from one RNC to another RNC which may be homed to a different MSC and a different SGSN affects the demand distribution in the core network. The relative merit of load balancing among a plurality of radio network controllers against the resulting increase in handover traffic and signaling may then need to be evaluated. Therefore, a method for providing capacity planning for core network nodes needs that takes into account various factors, e.g., penalty factors, will be beneficial to service providers of wireless networks.

In one embodiment, the current method performs the planning of the deployment of mobile switching centers (MSCs) and gateway mobile switching centers (GMSCs) in accordance with several factors, e.g., the need to provide load balancing among the existing MSCs and GMSCs, the need to minimize the handover of traffic across MSC boundaries, the need to minimize the handover of traffic across GMSC boundaries, the need to minimize capital cost of deploying new MSCs, the need to minimize capital cost of deploying new GMSCs, the need to minimize radio network control to MSC re-homing, the need to minimize base station controller to MSC re-homing, the need to minimize the number of MSCs assigned to radio network controller groups, the need to minimize the number of MSCs assigned to base station controller groups, the need to minimize cost of backhauling (transport cost from radio network controller or base station controller to the MSC), the need to automatically incorporate key MSC and GMSC parameters computed based on actual observations, the need to account for network performance data, the need to account for user behavior data, and the like.

As illustrated by the above example, the penalties (broadly advantages and disadvantage) associated with load-balancing and handover minimization need to be carefully weighed against each other. Moreover, user considerations (e.g., user behavior data) may affect the relative weighting between load balancing and handover minimization.

For example, a group of radio network controllers may be intentionally grouped together and will be better served by the same MSC. For example, if most calls are among users communicating via a specific set of base stations homed to a specific set of radio network controllers, then homing the set of radio network controllers to the same MSC should be beneficial. However, in another example, load balancing may be more important than homing the group of radio network controllers to the same MSC, i.e., the traffic load can be divided among a plurality of MSCs. Similarly, a group of base station controllers may be intentionally grouped together and homed to a same MSC, or intentionally homed to different MSCs. It is important to note that a group may also be established for homing consideration such that the group comprises at least one base station controller and at least one radio network controller. For example, a group that comprises at least one base station controller and at least one radio network controller can be formed and then the base station controller and radio network controller may be homed to different MSCs such that a user has access to both the 2G and 3G networks. Hence, the members of the group may be determined by the service provider, as needed for the specific market.

In one embodiment, the number of MSCs assigned to groups of radio network controllers and/or base station controllers may be defined based on geographical clustering. For example, proximity to large cities, cultural venues, transportation hubs, etc. may increase connectivity among a plurality of radio network controllers and/or base station controllers. In one embodiment, various MSC and GMSC parameters computed based on actual observations may be used in market specific call models for future MSC and GMSC capacity planning.

In one embodiment, there may be constraints placed on homing requirements of the radio network controllers, base station controllers, or both radio network controllers and base station controllers. For example, certain radio network controllers may be required to be homed to a given MSC, certain base station controllers may be required to be homed to a given MSC, certain radio network controllers may be required not to be homed to a given MSC, base station controllers may be required not to be homed to a given MSC, certain groups of radio network controllers, certain groups of base station controllers, or certain groups of radio network controllers and base station controllers may be required to be homed to a same MSC, certain groups of radio network controllers may be required to be homed to different MSCs, certain groups of base station controllers may be required to be homed to different MSCs, and so on.

In one embodiment, user behavior data and preference data are used to capture the dynamic nature of user applications. For example, new user behaviors may impose different constraints in terms of the amount of traffic the MSC and GMSC need to handle. For instance, increased use of short messaging service (SMS) may impact the voice erlang capacity of MSCs. Similarly, shorter mean holding time (shorter call duration) may put extra signaling load on MSCs. In one example, the users may be accessing services via 2G networks, via 3G networks, via either a 2G or 3G network. The MSC and GMSC may then need to handle different amount of traffic based on the types of wireless networks being used to access services.

In one embodiment, MSCs and GMSCs at different physical locations may have different requirements. For example, an MSC, serving radio network controllers that control base stations in a large metropolitan area, may have a different requirement as compared to an MSC serving radio network controllers in a less densely populated area.

In one embodiment, the call models for calls traversing the radio network controllers or base station controllers may change over time. For example, a call model may change based on season of the year, day of the week, time of day, introduction of new user device types, introduction of new applications, etc. Since the call models are dynamic, the performance of the MSCs and GMSCs need to be assessed based on the changing call models. For example, an MSC may be adequate for homing a large number of radio network controllers near a cultural venue when the venue has limited use. However, when the venue is fully utilized, there may be additional traffic being supported by the radio network controllers near the venue, thereby potentially requiring additional radio network controllers to be added near the venue, etc. Hence, additional MSCs that support the radio network controllers may be needed. Thus, the call models and user behavior will affect the performance of the MSCs and GMSCs in the network throughout the life of the MSCs and GMSCs.

In one embodiment, the current method gathers network performance data to evaluate how well the MSCs and GMSCs are meeting the various requirements. In one example, an MSC's performance may be measured in terms of how many Erlangs the MSC can handle, how many voice calls may be routed through the MSC, the MSC's capacity limit, etc. In one example, a GMSC's performance may be measured in terms of how many Erlangs the GMSC can handle, how many voice calls may be routed through the GMSC, the GMSC's capacity limit, etc. The performance data for each MSC and GMSC is then obtained and analyzed to evaluate key performance parameters. The result of the analysis may then be used for MSC and GMSC planning.

In one embodiment, the MSC and GMSC planning may be used to provide efficient boundary for radio network controller and base station controller homing, re-homing, or a combination of homing and re-homing. For example, the method may provide MSC and GMSC plans, for each forecasting period, such that all business, cost and engineering constraints are met. Thus, in one embodiment one goal is then to minimize the overall penalty factors. In one example, radio network controllers in a 3G network may be re-homed based on a computation of capacity planning. In one example, base station controllers in a 2G network may be re-homed based on a computation of capacity planning. It should be noted that the references to the 2G and 3G networks are only illustrative and should not be interpreted as a limitation of the present disclosure. In one example, the planning may be used to determine an optimal upgrade or deployment schedule for new and/or existing MSCs and/or GMSCs.

In order to provide the planning of the MSCs and GMSCs while considering all of the above penalty factors, the current method first defines an objective function that is based on one or more of the penalty factors described above.

In one embodiment, the objective function is defined based on the following penalty factors: geographical clustering, handover traffic, load balancing, radio network controller to MSC re-homing, base station controller to MSC re-homing, and budgetary limitations (e.g., cost of an MSC and cost of a GMSC). In one embodiment, the objective function is expressed as:

$$\sum_{j \in MSC} \text{Cost}[j] * Y[j, t] + \sum_{k \in GMSC} \text{Cost}[k] * Z[k, t] + \quad \text{Equation (1)}$$

$$\sum_{j \in MSC} F^{LoadBalance}(CPU^{Avg}[t],$$

$$CPU[i, t], x[i, j, t], i \in RNC \cup BSC) +$$

$$\sum_{j \in MSC} \sum_{i \in RNC \cup BNC} \sum_{i' \in RNC \cup BNCi} H[i, i', t]$$

$$F^{Handover}(x[i, j, t], x[i', j, t]) +$$

$$\sum_{i \in RNC \cup BNC} \sum_{j \in MSC} \sum_{j' \in MSC} F^{Rehome}(x[i, j, t],$$

$$x[i, j', t-1])$$

For clarity purposes, the various terms used in the above equation (1) are described below. The optimal solution for equation (1) may be found using a linear programming method. For example, a linear programming solver may be used. The decisions associated with the optimal solution take only integer values. For example, the decisions may involve one or more of: how many new MSCs are needed, how many new GMSCs are needed, which one of the MSCs should be used for homing each one of the radio network controllers, which one of the MSCs should be used for homing each one of the base station controllers, which one of the GMSCs should be used for homing each one of the MSCs, etc. Hence, the problem may be defined as a mixed integer programming problem. For ease of understanding, a first decision variable to represent a connection between an RNC and an MSC, a second decision variable to indicate if a new MSC should be added, a third decision variable to indicate if a new GMSC should be added and a fourth decision variable to represent a connection between an MSC and a GMSC are first defined.

In one embodiment, the first decision variable is Variable x[i, j, t] which is defined as a set of binary variables x that represent the connection between an RNC (or a BSC) and an MSC in time period t, wherein $$x[i, j, t] = \begin{cases} 1 & \text{if the } RNC \text{ or } BSC \text{ } i \text{ is assigned to the } MSC \text{ } j \text{ in period } t, \\ 0 & \text{otherwise.} \end{cases}$$

The variables x are defined over all possible connection combinations between an RNC or BSC and an MSC in time period t. For example, for a specific RNC or BSC, there is a group of n MSCs to which the specific RNC or BSC can be connected. Accordingly, a group of variables x[i, j, t], i ∈ MSC are defined. It is important to note that one and only one variable x[i, j, t] in this group must have a value of one (implying a connection to the specific MSC), the rest of the variables x[i, j, t] have a value of zero (implying no connection to the specific MSC).

In order to ensure that an RNC or BSC is homed (connected) only to one MSC, the current method utilizes an additional constraint:

$$\sum_{j \in MSC} x[i, j, t] = 1, \forall i \in RNC \cup BSC.$$

In one embodiment, the second variable is Variable Y[j, t], which is defined as a set of binary variables Y that represent if a new MSC is to be added in time period t, wherein $$Y[j, t] = \begin{cases} 1 & \text{if new } MSC \text{ } j \text{ is added in time period } t \\ 0 & \text{Otherwise.} \end{cases}$$

The variables Y[j, t] are defined over all possible new MSC locations. In order to ensure that no RNC (or BSC) is connected to the new MSC unless the new MSC is added to the market, the current method adds the following logical constraint:

$$\sum_{i \in RNC \cup BSC} x[i, j, t] \leq *M, \forall j \in MSC.$$

wherein, the M represents a large number, e.g., 10,000.

If Y[j, t]=0, the inequality forces all x terms on the left hand side to be zero. Hence, the summation at the left hand side is forced to be equal to zero. This implies that no RNC or BSC can be connected to the new MSC if the MSC is not added to the market.

In one embodiment, the third variable is Variable Z[k, t], which is defined as a set of binary variables Z that represent if a new GMSC is to be added in time period t, wherein $$Z[k, t] = \begin{cases} 1 & \text{if new } GMSC \text{ } k \text{ is added in time period } t \\ 0 & \text{Otherwise.} \end{cases}$$

The variables Z[k, t] are defined over all possible new GMSC locations. In order to ensure that no MSC is connected to the new GMSC unless the new GMSC is added to the market, the current method adds the following logical constraint:

$$\sum_{j \in MSC} z[j, k, t] \leq Z[k, t]*M, \forall k \in GMSC$$

wherein, the M represents a large number, e.g., 10,000.

If Z[k, t]=0, the inequality forces all z terms on the left hand side to be zero. Hence, the summation at the left hand side is forced to be equal to zero. This implies that no MSC can be connected to the new GMSC if the GMSC is not added to the market.

In one embodiment, the fourth decision variable is Variable z[j, k, t] which is defined as a set of binary variables z that represent the connection between an MSC and a GMSC in time period t, wherein $$z[j, k, t] = \begin{cases} 1 & \text{if the } MSC \text{ } j \text{ is assigned to the } GMSC \text{ } k \text{ in period } t, \\ 0 & \text{otherwise.} \end{cases}$$

The variables z are defined over all possible connection combinations between an MSC and a GMSC in time period t. For example, for a specific MSC, there is a group of n GMSCs to which the specific MSC can be connected. Accordingly, a group of variables z[j, k, t], k ∈ GMSC are defined. It is important to note that one and only one variable z[j, k, t] in this group must have a value of one (implying a connection to the specific GMSC), the rest of the variables z[j, k, t] have a value of zero (implying no connection to the specific GMSC).

in order to ensure that an MSC is homed (connected) at most one GMSC, the current method utilizes an additional constraint (an MSC may not home to an GMSC):

$$\sum_{k \in GMSC} z[j, k, t] \leq 1, \forall j \in MSC.$$

Returning to Equation 1, a new MSC and a new GMSC are deployed if the new MSC and the new GMSC meet budgetary limitations. The current method incorporates the penalty associated with budgetary limitations in the objective function via the terms:

$$\sum_{j \in MSC} Cost[j]*(Y[j, t]) \text{ and,}$$

$$\sum_{k \in GMSC} Cost[k]*(Z[k, t]).$$

The objective function accounts for penalty associated with handover via the term:

$$\sum_{j \in MSC} \sum_{i \in RNC \cup BNC} \sum_{i' \in RNC \cup BNC \setminus i} H[i, i', t] F^{Handover}(x[i, j, t], x[i', j, t]).$$

The penalty of handover H[i, i', t] is the penalty for handover between RNCs (or BSCs) i and i' during time period t, if the RNCs (or BSCs) i and i' are not assigned to a same MSC. It is desirable to have RNCs and BSCs in the same geographical area to connect to a same MSC in any given period. The function, $F^{Handover}(x[i, j, t], x[i', j, t])$, may then be selected such that the penalty in the objective function becomes zero if RNCs i and i' connect to the same MSC. That is, the penalty is zero, if x[i, j, t] and x[i', j, t] are identical. For example, the method may define $x^{HO}[i, i', t] \geq x[i, j, t] - x[i', j, t]$, $\forall j \in MSC$, wherein $x^{HO}[i, i', t] \geq 0$. Then, since $x^{HO}[i, i', t]$ is non-negative, $x^{HO}[i, i', t]$ becomes 1 if i and i' connect to different MSCs, and the handover traffic will be penalized.

The objective function includes the penalty associated with load balancing via the term:

$$\Sigma_{j \in MSC} F^{LoadBalance}(CPU^{Avg}[t], CPU[i, t], x[i, j, t], i \in RNC \cup BSC).$$

The objective is defined such that large deviations in MSC CPU loading from the average are penalized. The goal is then to keep the difference between the traffic loading at each MSC and the average load as small as possible, such that the RNCs and BSCs are evenly distributed among the MSCs in terms of CPU load. Since the objective function is solved while minimizing deviations from the average CPU load, the method first determines the average CPU load of an MSC for the given market. In one embodiment, the average CPU load is defined as:

$$CPU^{Avg}[t] = \frac{\sum_{i \in RNC \cup BSC} CPU[i, t]}{|MSC| + \sum_j Y[j, t]},$$

wherein $\Sigma_j Y[j, t]$ denotes the number of new MSCs that are added in period t.

In one embodiment, the method performs the load balancing by minimizing a summation of squared deviations from the average CPU load. In one embodiment, the summation of squared deviations from the average CPU load is defined as:

$$\Sigma_{j \in MSC}(\Sigma_{i \in RNC \cup BSC} CPU[i, t]*x[i, j, t] - CPU^{Avg}[t])^2.$$

However, using the above average CPU load renders the objective function non-linear. In one embodiment, in order to overcome the non-linearity of the objection function, the method solves the objective function in two stages. In the first stage, the method ignores the load-balancing term of the objective function and determines the number of new MSCs that need to be added to meet the RNC and BSC demands. The total number of new MSCs is then used to compute the average CPU load. In the second stage, the method uses the computed average CPU load, rendering the load balancing term of the objective function a quadratic term that is no longer a function of a decision variable.

In one embodiment, the method linearizes the above quadratic term. In one embodiment, the linearizing of the quadratic term is performed by using an absolute difference function:

$$\Sigma_{j \in MSC} |\Sigma_{i \in RNC \cup BSC} CPU[i, t]*x[i, j, t] - CPU^{Avg}[t]|.$$

Then, $|\Sigma_{i \in RNC \cup BSC} CPU[i, t]*x[i, j, t] - CPU^{Avg}[t]| = CPU^+[j, t] - CPU^-[j, t]$, where $CPU^+[j, t] \geq 0$ and $CPU^-[j, t] \geq 0$. Then, the total absolute difference may be replaced by the linear term, $$\Sigma_{j \in MSC}(CPU^+[j, t] + CPU^-[j, t]).$$

In one embodiment, the method performs the load balancing by using a tolerance level for a deviation from the average CPU load and defining constraints that are based on the tolerance level. The load balancing penalty term in the objective function may then be omitted in favor of the constraints that are defined based on the tolerance level. For example, the method may define a tolerance level, p, for the deviation from the average CPU load, wherein $p \in (0,1)$. The load balancing penalty term of the objective function may then be eliminated and the following constraints may be added:

$$\Sigma_{i \in RNC \cup BSC} CPU[i, t]*x[i, j, t] \leq (1+p)CPU^{Avg}[t],$$
$$\forall MSC$$

$$\Sigma_{i \in RNC \cup BSC} CPU[i, y]*x[i, j, t] \geq (1-p)CPU^{Avg}[t],$$
$$\forall MSC.$$

The objective function includes the penalty associated with re-homing via the term:

$$\sum_{i \in RNC \cup BNC} \sum_{j \in MSC} \sum_{j' \in MSC} F^{Rehome}(x[i, j, t], x[i, j', t-1]).$$

The penalty associated with re-homing refers to a penalty term for re-homing an RNC (or BSC) from one MSC to a different MSC. It is important to note that having RNCs (or BSCs) assigned to different MSCs over successive periods is undesirable. However, as the performance considerations an objective change over time, an optimal performance may require re-homing the RNCs (or BSCs) to other MSCs. In order to limit the number of re-homes, the objective function includes a penalty factor associated with such behavior. The service provider may limit the number of re-homings.

In one embodiment, the number of re-homings is limited by performing the assigning of RNCs and BSCs to MSC in stages. In one embodiment, the stages comprise time stages. At the beginning of a time period t, a set of assignments from a previous period are obtained. For example, the set of assignments $\{\theta[i,j], i \in RNC \cup BSC, j \in MSC\}$ from the previous time period may be defined as:

$$\theta[i, j] = \begin{cases} 0 & \text{if RNC or BSC } i \text{ was assigned to MSC } j, \\ 1 & \text{otherwise.} \end{cases}$$

Then, the objective function may include a penalty for re-homing for period t, via the term:

$$\sum_{i \in RNC \cup BNC} \sum_{j \in MSC} (\theta[i, j] * x[i, j, t]).$$

In one embodiment, the current method limits the number of re-homings using a constraint. For example, the service provider may set a limit for a maximum number of re-homing for a time period. For example, if the user specifies the limit as being Rehome_Limit, the method may add an objective function based on the Rehome_Limit. The objective function may then be solved subject to the constraint on the limit. In one embodiment, the constraint that limits the number of re-homing for a time period is defined as:

$$\Sigma_{i \in RNC \cup BNC} \Sigma_{j \in MSC}(\theta[i, j]*x[i, j, t]) \leq \text{Rehome\_Limit}.$$

In one embodiment, the objective function also includes a penalty for connecting a radio network controller or a base station controller to an MSC which is not geographically the closest to the radio network controller or base station controller. For example, the distance between a radio network controller (or base station controller) and the location of an MSC may be represented by Distance[RNC or BSC, MSC, t]. The location of the MSC may then be defined as the centroid of an MSC based on the centroid of the RNCs and BSCs that are connected to the MSC. The method may then add another term to the objective function that depends on the distance between the RNC or BSC and the MSC to which the RNC or BSC is connected. Including the penalty for connecting to an MSC that is not geographically the closest has the effect of clustering the radio network controllers and base station controllers to their closest MSC, in terms of geographical location.

The objective function of equation (1) is then a linear combination of all the above penalty functions. In one embodiment, the method then defines terms that serve as weight factors for differentiating the relative importance of a particular penalty factor as compared to other penalty factors in the objective function. Each penalty factor then has a weight factor that differentiates the relative importance of the particular penalty factor as compared to other penalty factors. In one example, the penalty for re-homing may be more important than the penalty for meeting budget targets. In another example, the penalty associated with load balancing may be more important. In one embodiment, a user may modify the weight factor associated with a penalty factor. For example, the weight factor associated with a penalty factor can be modified using a slider scale with values from "zero" to "one". For example, moving a slider scale for penalty associated with load balancing towards "one" gives more importance to load balancing as compared to other penalties. In one embodiment, a default value of 0.5 is assigned to a slider scale associated with any one of the above penalties.

The objective function of equation (1) needs to be solved subject to business, cost and engineering constraints. For example, interface ports have limits on throughput. In another example, the cost of the MSCs and GMSCs has constraints. The capacity of each MSC and GMSC is clearly bounded, and so on.

In one embodiment, the equation (1) is solved via a linear programming solver by: adding a necessary number of new MSCs; evaluating all possibilities of radio network controller assignments to the MSCs (new and existing); evaluating all possibilities of base station controller assignments to the MSCs (new and existing); evaluating all possibilities of MSC assignments to the GMSCs (new and existing); and achieving an optimal solution. In one embodiment, the optimal solution satisfies all business, cost and engineering constraints, while minimizing the objective function defined by equation (1).

The current method includes the engineering, cost and business constraints by first classifying the constraints into one or more of the following categories: call server capacity constraints, interface bandwidth constraints or control plane constraints. The call server capacity constraints, interface bandwidth constraints and control plane constraints are related to one or more constraints of the MSC parameters.

In one embodiment, the current method relates the call server capacity constraints for 2G and 3G networks to the constraints of the MSC parameters: busy hour call attempt, CP load (CP load refers to control plane CPU load), Erlang, and Memory.

In one embodiment, the constraint on a busy hour call attempt (BHCA) parameter is a function of traffic demand specified in units of Erlangs.

In one embodiment, the busy hour call attempt parameter is defined as:

$\Sigma_{i \in RNC \cup BSC} x[i, j, t] * f^{BHCA}(Erlang[i, t]) \leq BHCA\_Capacity[j, t]$.

In one embodiment, the constraint on a CP load parameter is defined as:

$\Sigma_{i \in RNC \cup BSC} x[i, j, t] * f^{CP}(Erlang[i, t]) \leq CPU\_utilization\_limit[j, t]$.

In one embodiment, the constraint on the memory parameter is defined as:

$\Sigma_{i \in RNC \cup BSC} x[i, j, t] * f^{Memory}(Erlang[i, t]) \leq Memory\_utilization\_limit[j, t]$.

In one embodiment, the current method relates the control plane constraints to the constraints of the MSC parameter used for management of resources and mobility.

In one embodiment, the control plane constraints are related to a constraint of the MSC parameter, SS7 signaling constraint. For example, the constraint of the SS7 signaling parameter, may be defined as:

$$\sum_{i \in RNC \cup BSC} x[i, j, t] * f^{SS7}(Erlang[i, t]) \leq SS7\_capacity[j, t].$$

In one embodiment, the current method relates the interface bandwidth constraints to the constraints of the MSC parameters: total ports; A-interface ports; IuCS ports; and public switched telephone network (PSTN) ports.

In one embodiment, the constraint on the MSC parameter IuCS ports is defined as:

$\Sigma_{i \in RNC} x[i, j, t] * f^{IuCS}(Erlang[i, t]) \leq IuCS\_Ports\_capacity[j, t]$.

In one embodiment, the constraint on the MSC parameter A-interface is defined as:

$\Sigma_{i \in BSC} x[i, j, t] * f^{A-int}(Erlang[i, t]) \leq A\_interface\_Ports\_capacity[j, t]$.

Figure 2:
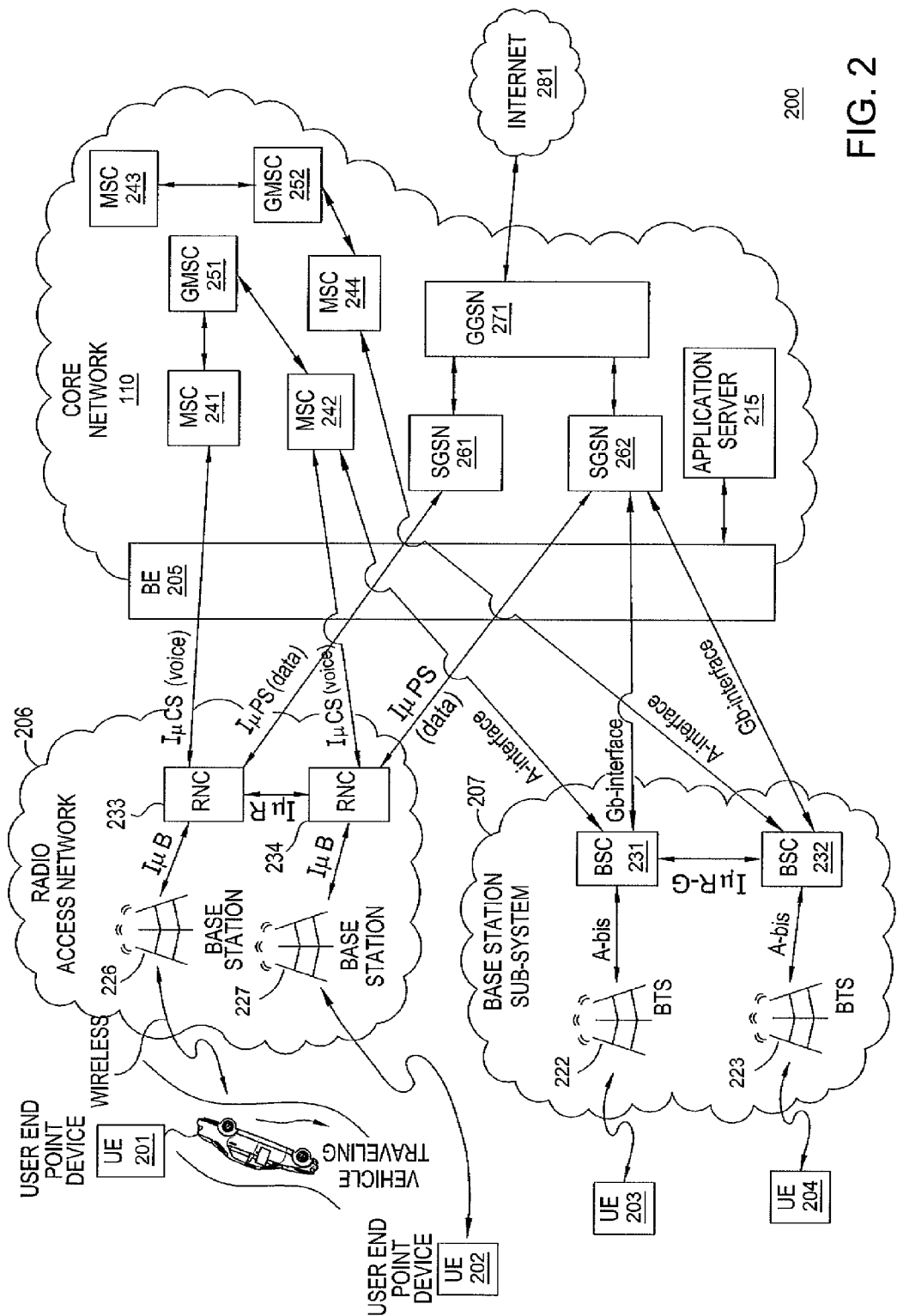
FIG. 2 provides an exemplary network with the current method of planning mobile switching centers.

FIG. 2 provides an exemplary illustration 200 of a network with the current method of planning MSCs. For example, the current method for planning MSCs is implemented in an application server 215 located in the core network 110. Alternatively, the application server 215 can be deployed external to the core network. The end point devices communicate with the core network 110 via a radio access network 206 or a base station sub-system 207 and border element (BE) 205.

In one embodiment, the core network 110 comprises mobile switching centers (MSCs) 241-244, gateway mobile switching centers (GMSCs) 251-252, serving GPRS support nodes (SGSNs) 261 and 262, a gateway GPRS support node (GGSN) 271. In one embodiment, the radio access network 206 comprises base stations 226 and 227 and radio network controllers 233 and 234. In one embodiment, the base station sub-system 207 comprises base transceiver stations 222-223 and base station controllers 231 and 232.

In one embodiment, the base station 226 communicates with the radio network controller 233 via an IuB interface and is controlled by the radio network controller 233. Base station 227 communicates with a radio network controller 234 via an IuB interface and is controlled by the radio network controller 234. The base stations 226 and 227 communicate with one or more user endpoint devices 201-202 via a wireless interface. Communication among the plurality of radio network controllers (e.g., RNCs 233 and 234) is performed over an IuR interface. The radio network controllers 233 and 234 communicate with the MSCs 241 and 242, respectively, e.g., for routing voice calls. The interface between a respective radio network controller 233 or 234 and a respective MSC 241 or 242 is an IuCS-interface. Similarly, the radio network controllers 233 and 234 communicate with the SGSNs 261 and 262, respectively, e.g., for routing data calls. The interface between a respective radio network controller 233 or 234 and a respective SGSN 261 or 262 is an IuPS interface.

In one embodiment, the base transceiver station 222 communicates with the base station controller 231 via an A-bis interface and is controlled by the base station controller 231. Base transceiver station 223 communicates with a base station controller 232 via an A-bis interface and is controlled by the base station controller 232. The base stations 222 and 223 communicate with one or more user endpoint devices 203-204 via a wireless interface. Communication among the plurality of base station controllers (e.g., BSCs 231 and 232) is performed over an IuR-G interface. The base station controllers 231 and 232 communicate with the MSCs 242 and 244, respectively, e.g., for routing voice calls. The interface between a respective BSC 231 or 232 and a respective MSC 242 or 244 is an A-interface. Similarly, the BSCs 231 and 232 communicate with the SGSNs 261 and 262, respectively, e.g., for routing data calls. The interface between a respective base station controller 231 or 232 and a respective SGSN 261 or 262 is a Gb-interface.

In one embodiment, the MSCs 241 and 242 are in communication with a GMSC 251. The MSCs 243 and 244 are in communication with a GMSC 252. When the GMSC 251 receives a voice call from the MSC 241 or 242, the GMSC 251 determines which one of the MSCs 241-244 is being visited by a called party of the received voice call. If the MSC being visited by the called party is assigned to another GMSC (e.g., GMSC 252), the GMSC 251 hands over the call to GMSC 252. The voice call is then forwarded to the MSC being visited by the called party. Similarly, data calls are routed to their destination via an RNC or BSC, an SGSN 261 or 262 and the GGSN 271. The GGSN 271 is in communication with external networks, e.g., the internet 281. If the call is intended for a called party not serviced by the core network 110, the GGSN 271 may then forward the call to the external network.

In one embodiment, the user of the endpoint device 201 may travel from a geographical area served by the base station 226 to a geographical area served by the base station 227. As the user travels to various locations, the radio network controller 233 may have to handover an ongoing voice call to the radio network controller 234. The radio network controller 233 is homed to MSC 241 and the radio network controller 234 is homed to MSC 242. Once the handover is accomplished, the MSC 242 handles the voice call to and from the user endpoint device 201. It should be noted that FIG. 2 only provides simplified views of the radio access network and the base station sub-system. As such, additional base stations, base station controllers, and radio network controllers can be deployed without changing the scope of the present disclosure.

In one embodiment, the current method provides planning of MSCs and GMSCs and their respective boundaries based on one or more of the above factors such that a plurality of MSCs and GMSCs may function optimally network wide. It should be noted that the present method does not require that all of the above discussed factors be considered. The factors that will be considered will be governed by the requirements of a particular deployment.

In order to provide planning of the MSCs and GMSCs, the current method calculates values for one or more MSC parameters. The parameters may be needed for one or more of the penalty factors of the objective function. For example, a parameter may affect one or more of: penalty factor associated with geographical clustering, penalty factor associated with handover traffic, penalty factor associated with load balancing, penalty factor associated with base station controller re-homings, penalty associated with radio network controller re-homings and penalty factor associated with budgetary limitations.

In one embodiment, the input data for calculating the values for the one or more MSC parameters may comprise one or more of:
busy hour demand forecast;
transport cost (backhauling to an MSC and GMSC);
MSC and GMSC locations;
handover data;
unit cost for new MSCs and the time required to deploy new MSCs;
unit cost for new GMSCs and the time required to deploy new GMSCs;
unit cost for re-homing and time required for re-homing;
unit cost for software upgrade and time required for software upgrade;
user preference to allow or disallow deployment of new MSC or GMSC, re-homing of radio network controllers and base station controllers, and/or software upgrade; and
user preference to control quantity and time of new MSCs, re-homing of radio network controllers and base station controllers and/or software upgrade.

In one embodiment, the method may then analyze the results to determine if limits for any of the one or more MSC parameters are exceeded. If the limits are exceeded, the method then proceeds to identify an optimal output. In one embodiment, if limits are not reached or exceeded, re-optimizing may be performed to provide an improvement. In one embodiment, if the limits are not reached, the method for the optimization may simply be delayed until new data is gathered.

In one embodiment, the current method provides an optimal output that may comprise: adding one or more new MSCs, adding one or more new GMSCs, providing load balancing among existing MSCs, providing load balancing among existing GMSCs, minimizing handover traffic, performing upgrades on existing MSCs, and performing upgrades on existing GMSCs. The optimal output is derived by finding the optimal solution for the objective function of Equation 1.

In one embodiment, the current method provides one or more of the following schedules or reports based on the above optimal output:
a time series for MSC additions;
a time series for GMSC additions;
a time series for MSC upgrades;
a time series for GMSC upgrades;
a time series for radio network controller re-homing and/or load balancing;
a time series for base station controller re-homing and/or load balancing;
a time series for radio network controller to an MSC assignment;
a time series for base station controller to an MSC assignment;
a time series for MSC to GMSC re-homing and/or load balancing;
a time series for MSC to a GMSC assignment; and
a report for triggering radio access network, base station sub-system, or core network activities.

It is important to note that the above optimal output may be determined in conjunction with other methods that add radio network controllers or base station controllers. For example, if there is more demand, one or more RNCs, BSCs and base stations may need to be added in order to handle the connectivity to the user endpoint devices. Hence, the base stations, BSCs and RNCs may be added in the process of determining an optimal output for planning of MSCs and GMSCs.

Figure 3:
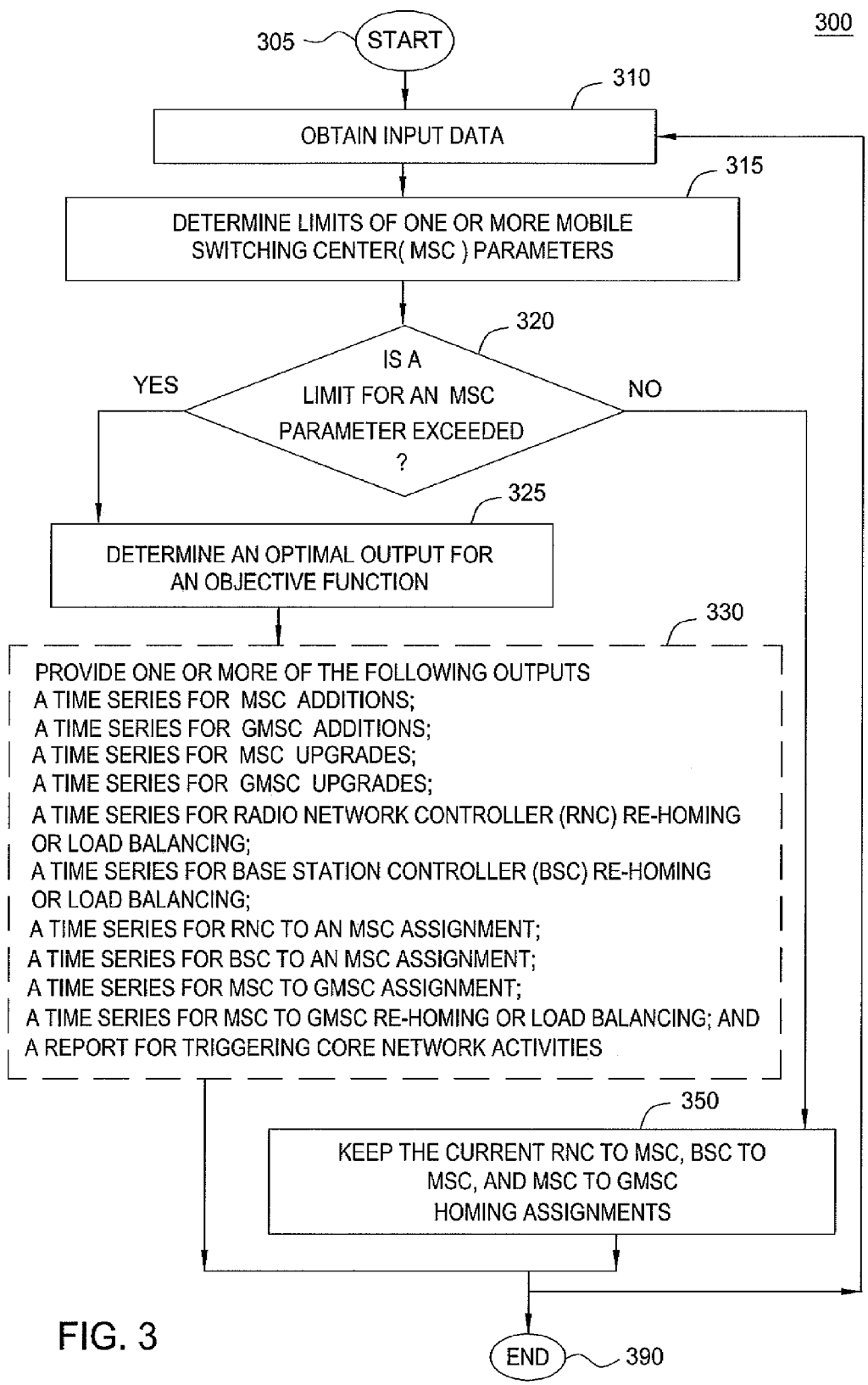
FIG. 3 illustrates a flowchart of the method for planning mobile switching centers in a wireless network.

FIG. 3 illustrates a flowchart of a method 300 for planning MSCs and GMSCs in a wireless network, e.g., a 3G network, a 2G network, etc. The method 300 may be implemented in an application server (or a general purpose computer as disclosed in FIG. 4 below) located in the service provider's network. For example, the method is implemented in the application server 215 deployed in the core network 110. Method 300 starts in step 305 and proceeds to step 310.

In step 310, method 300 obtains input data for determining values of one or more MSC parameters. For example, the input data may comprise one or more of:
  busy hour demand forecast;
  transport cost (backhauling to an MSC and GMSC);
  MSC and GMSC locations;
  handover data;
  unit cost for new MSCs and the time required to deploy new MSCs;
  unit cost for new GMSCs and the time required to deploy new GMSCs;
  unit cost for re-homing and time required for re-homing;
  unit cost for software upgrade and time required for software upgrade;
  user preference to allow or disallow deployment of new MSC or GMSC, re-homing of radio network controllers and base station controllers, and/or software upgrade; and
  user preference to control quantity and time of new MSCs, re-homing of radio network controllers and base station controllers and/or software upgrade.

In step 315, method 300 determines the values (broadly limits) of the one or more MSC parameters. For example, the method may determine Erlangs for each MSC, performance data for each MSC, backhauling cost for each MSC, etc.

In optional step 320, method 300 determines if a limit for an MSC parameter is exceeded. For example, BHCA limits, may be reached for one or more MSCs. In another example, the performance of one or more MSCs may be degraded. In one embodiment, if at least one limit is exceeded, the method proceeds to step 325. However, it should be noted that method 300 can be triggered even if no limit has been exceeded. For example, the method 300 can be triggered manually if there is a need or a desire to perform a re-optimization analysis. Otherwise, the method proceeds to step 350, or alternatively to step 325 to re-optimize the radio network controller to MSC connectivity, and/or the base station controller to MSC connectivity.

In step 325, method 300 determines an optimal output for an objective function, wherein the objective function is based on one or more penalty factors. For example, the objective function may be defined based on one or more of the following penalty factors: geographical clustering, handover traffic, load balancing, radio network controller re-homing, base station controller re-homing and one or more budgetary limitations. The optimal output is then the output that minimizes the penalty over all the penalty factors. That is, the optimal output minimizes the objective function provided in Equation (1) as discussed above.

In one embodiment, the current method provides an optimal output that may comprise: adding new MSCs, adding new GMSCs, providing load balancing among existing MSCs, providing load balancing among existing GMSCs, minimizing handover traffic, performing upgrades on existing MSCs, and performing upgrades on existing GMSCs. The method then proceeds to an optional step 330.

In optional step 330, method 300 provides one or more of the following outputs based on the above optimal output:
  a time series for MSC additions;
  a time series for GMSC additions;
  a time series for MSC upgrades;
  a time series for GMSC upgrades;
  a time series for radio network controller re-homing and/or load balancing;
  a time series for base station controller re-homing and/or load balancing;
  a time series for radio network controller to an MSC assignment;
  a time series for base station controller to an MSC assignment;
  a time series for MSC to GMSC re-homing and/or load balancing;
  a time series for MSC to a GMSC assignment; and
  a report for triggering radio access network, base station sub-system, or core network activities.

The method then either proceeds to step 390 to end processing the current planning data, or to return to step 310 to receive more input data.

In step 350, method 300 keeps the current radio network controller to MSC homing assignments, the current base station controller to MSC homing assignments, and the current MSC to GMSC homing assignments. The method then either proceeds to step 390 to end processing the current planning data, or to return to step 310 to receive more input data.

In one embodiment, the above optimal output is determined by minimizing the objective function provided in Equation (1), while considering all of the above constraints simultaneously.

In one embodiment, the above optimal output is determined by minimizing the objective function provided in Equation (1) via a multistep-wise approach. For example, the method may first determine a specific number of MSCs and GMSCs needed in order to satisfy: all the capacity requirements and homing assignments of RNCs and BSCs, and business rules of a market. The method then proceeds to determine the optimal solution for the resulting specific number of MSCs and GMSCs. As described earlier, the determination of the optimal output may also include adding RNCs, BSCs and base stations to meet the demand.

For instance, there may be service provider or user preferences that disallow a certain group of RNCs from being homed to a same MSC. Similarly, other groups of RNCs may be required to be homed to a same MSC. The first step may then be determining the number of MSCs, using the capacity requirements and the rules that apply to a specific market. The number of new MSCs may then be determined by subtracting the number of MSCs already implemented from the number of MSCs needed for the specific market. The average loading of the MSC may then be determined from the number of MSCs and the total demand for the specific market. Once the average loading of the MSCs is known, the method determines the optimal output by minimizing the objection function provided in Equation (1), while considering penalties associated with load balancing, a number of handover, a number of re-homing, geographical clustering, and all cost (including MSC, GMSC and SS7 signaling), engineering and business constraints. The multistep approach enables the linear programming solver to perform the search for the optimal solution without necessarily having to perform an exhaustive search that calculates the penalty for every possible homing assignment of each RNC and BSC to every possible MSC. The number of GMSCs to achieve the properly load balanced MSCs may then be determined. Alternatively, a number of constraints may be added to the objective function defined in Equation (1) such that the optimal number of GMSCs is determined while solving equation (1).

It should be noted that the above multistep-wise approach may comprise any number of steps. For example, the service provider may further limit based on geographical clustering prior to determining the optimal output of Equation (1). For example, if the service provider is able to eliminate some homing assignments due to geographical clustering, the optimal output may be determined only from among the allowed homing assignments.

It should also be noted that capacity planning of the MSCs may depend on connectivity to both 2G and 3G wireless networks, connectivity to only the 3G wireless networks, or connectivity to only the 2G wireless networks. As such, the optimal output may comprise: adding new MSCs, providing load balancing among existing MSCs, minimizing handover traffic, and performing upgrades on existing MSCs.

It should be noted that although not specifically stated, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
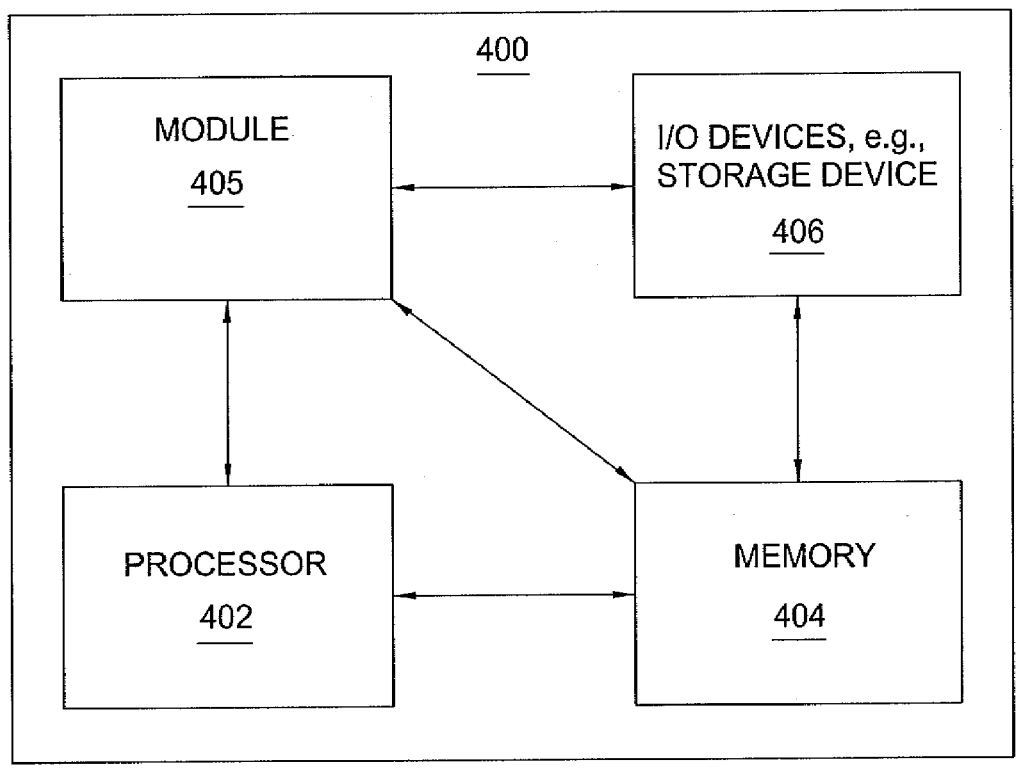
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for planning of mobile switching centers in a wireless network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents. In one embodiment, the present module or process 405 for planning of mobile switching centers in a wireless network, can be loaded into memory 404 and executed by processor 402 to implement the functions as discussed above. As such, the present method 405 for planning of mobile switching centers in a wireless network (including associated data structures) of the present disclosure can be stored on a non-transitory (e.g., tangible or physical) computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing planning of a plurality of mobile switching centers in a wireless network, comprising:
    obtaining, by a system comprising at least one processor, input data;
    determining, by the system, a limit for a mobile switching center parameter in accordance with the input data;
    determining, by the system, if the limit for the mobile switching center parameter is exceeded; and
    determining, by the system, an optimal output for an objective function, wherein the objective function is based on a plurality of penalty factors, if the limit for the mobile switching center parameter is exceeded, wherein each penalty factor of the plurality of penalty factors has a weight factor that differentiates a relative importance of each penalty factor as compared to other penalty factors of the plurality of penalty factors.

2. The method of claim 1, further comprising:
    providing a schedule based on the optimal output, wherein the schedule comprises a time series for mobile switching center additions.

3. The method of claim 1, further comprising:
    providing a schedule based on the optimal output, wherein the schedule comprises a time series for mobile switching center upgrades.

4. The method of claim 1, further comprising:
    providing a schedule based on the optimal output, wherein the schedule comprises a time series for radio network controller re-homing and load balancing.

5. The method of claim 1, further comprising:
    providing a schedule based on the optimal output, wherein the schedule comprises a time series for radio network controller to a mobile switching center assignment.

6. The method of claim 1, further comprising:
    providing a schedule based on the optimal output, wherein the schedule comprises a time series for base station controller re-homing and load balancing.

7. The method of claim 1, further comprising:
    providing a schedule based on the optimal output, wherein the schedule comprises a time series for base station controller to a mobile switching center assignment.

8. The method of claim 1, wherein the plurality of penalty factors comprises a penalty factor associated with handover traffic.

9. The method of claim 1, wherein the plurality of penalty factors comprises a penalty factor associated with load balancing.

10. The method of claim 1, wherein the plurality of penalty factors comprises a penalty factor associated with radio network controller re-homing.

11. The method of claim 1, wherein the plurality of penalty factors comprises a penalty factor associated with base station controller re-homing.

12. The method of claim 1, wherein the plurality of penalty factors comprises a penalty factor associated with a budgetary limitation.

13. The method of claim 1, wherein the weight factor is modified using a slider scale.

14. The method of claim 13, wherein the slider scale has a value set between a value of zero and a value of one.

15. The method of claim 1, wherein the plurality of penalty factors comprises a penalty factor associated with handover traffic, a penalty factor associated with load balancing, a penalty factor associated with radio network controller re-homing, a penalty factor associated with base station controller re-homing, and a penalty factor associated with a budgetary limitation.

16. The method of claim 1, wherein the input data comprises a busy hour demand forecast.

17. The method of claim 1, wherein the input data comprises a user preference.

18. A non-transitory computer-readable medium having stored thereon a plurality of instructions, the plurality of instructions including instructions which, when executed by a processor, cause the processor to perform operations for providing planning of a plurality of mobile switching centers in a wireless network, the operations comprising:
    obtaining input data;
    determining a limit for a mobile switching center parameter in accordance with the input data;

determining if the limit for the mobile switching center parameter is exceeded; and determining an optimal output for an objective function, wherein the objective function is based on a plurality of penalty factors, if the limit for the mobile switching center parameter is exceeded, wherein each penalty factor of the plurality of penalty factors has a weight factor that differentiates a relative importance of each penalty factor as compared to other penalty factors of the plurality of penalty factors.

19. An apparatus for providing planning of a plurality of mobile switching centers in a wireless network, comprising:

a processor; and a computer-readable medium in communication with the processor, wherein the computer-readable medium has stored thereon a plurality of instructions, the plurality of instructions including instructions which, when executed by a processor, cause the processor to perform operations, the operations comprising:

obtaining input data;

determining a limit for a mobile switching center parameter in accordance with the input data;

determining if the limit for the mobile switching center parameter is exceeded; and determining an optimal output for an objective function, wherein the objective function is based on a plurality of penalty factors, if the limit for the mobile switching center parameter is exceeded, wherein each penalty factor of the plurality of penalty factors has a weight factor that differentiates a relative importance of each penalty factor as compared to other penalty factors of the plurality of penalty factors.

* * * * *